United States Patent
Xu et al.

(10) Patent No.: US 11,443,100 B2
(45) Date of Patent: Sep. 13, 2022

(54) METHOD AND APPARATUS FOR CORRECTING CHARACTER ERRORS, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Mengdi Xu, Beijing (CN); Zhuobin Deng, Beijing (CN); Jiawei Lai, Beijing (CN); Zhihong Fu, Beijing (CN); Jingzhou He, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/950,975

(22) Filed: Nov. 18, 2020

(65) Prior Publication Data

US 2021/0390248 A1 Dec. 16, 2021

(30) Foreign Application Priority Data

Jun. 11, 2020 (CN) .......................... 202010530970.8

(51) Int. Cl.
*G06F 40/00* (2020.01)
*G06F 40/166* (2020.01)
(Continued)

(52) U.S. Cl.
CPC ............ *G06F 40/166* (2020.01); *G06F 40/20* (2020.01); *G06K 9/623* (2013.01); *G06K 9/628* (2013.01); *G06N 20/00* (2019.01)

(58) Field of Classification Search
CPC ........ G06F 40/20; G06F 40/166; G06K 9/623
See application file for complete search history.

(56) References Cited

U.S. PATENT DOCUMENTS

2019/0340233 A1    11/2019   Zhang et al.
2021/0271810 A1*    9/2021   Nadejde ................ G06F 40/232

FOREIGN PATENT DOCUMENTS

CN       104298672 A    1/2015
JP       2010067250 A   3/2010
JP       2019145023 A   8/2019

OTHER PUBLICATIONS

Xiong et al., Extended HMM and Ranking models for Chinese Spelling Correction, Proceedings of the Third CIPS-SIGHAN Joint Conference on Chinese Language Processing, pp. 133-138, Oct. 2014, retrieved at https://aclanthology.org/W14-6821.pdf (Year: 2014).*

(Continued)

*Primary Examiner* — Scott T Baderman
*Assistant Examiner* — Barbara M Level
(74) *Attorney, Agent, or Firm* — Brooks Kushman P.C.

(57) ABSTRACT

A method and apparatus for correcting character errors, an electronic device and a storage medium are disclosed, which relates to the natural language processing field and the deep learning field. The method may include: for a character to be processed, acquiring the score of each character in a pre-constructed vocabulary, the score being a score of the reasonability of the character in the vocabulary at the position of the character to be processed; selecting top K characters as candidates of the character to be processed, K being a positive integer greater than one; selecting an optimal candidate from the K candidates; and replacing the character to be processed with the optimal candidate if the optimal candidate is different from the character to be processed. With the solution of the present application, the accuracy of an error correction result, or the like, may be improved.

11 Claims, 4 Drawing Sheets

(51) Int. Cl.
    *G06N 20/00*      (2019.01)
    *G06F 40/20*      (2020.01)
    *G06K 9/62*       (2022.01)

(56) References Cited

OTHER PUBLICATIONS

Zhang et al., "Spelling Error Correction with Soft-Masked BERT" Shaohua Zhang, Haoran Huang, Jicong Liu and Hang Li, 9 pages, May 15, 2020, retrieved at https://arxiv.org/pdf/2005.07421.pdf (Year: 2020).*

Extended European Search Report of European Application No. 21162801.1 dated Sep. 8, 2021, 8 pages.

Yu et al., "Chinese Spelling Error Detection and Correction Based on Language Model, Pronunciation, and Shape", Proceedings of the Third CIPS-SIGHAN Joint Conference on Chinese Language Processing, Oct. 1, 2014, pp. 220-223, XP055835553, Stroudsburg, PA, USA, DOI: 10.3115/v1/W14-6835, Retrieved from the Internet: URL:https://aclanthology.org/W14-6835.pdf>.

* cited by examiner

METHOD AND APPARATUS FOR CORRECTING CHARACTER ERRORS, ELECTRONIC DEVICE AND STORAGE MEDIUM

CROSS-REFERENCE TO RELATED APPLICATIONS

The present application claims the priority of Chinese Patent Application No. 2020105309708, filed on Jun. 11, 2020, with the title of "Method and apparatus for correcting character errors, electronic device and storage medium". The disclosure of the above application is incorporated herein by reference in its entirety.

TECHNICAL FIELD

The present application relates to a computer application technology, and particularly to a method and apparatus for correcting character errors, an electronic device and a storage medium in the natural language processing field and the deep learning field.

BACKGROUND

Character error correction is often involved in the natural language processing field. In current character error correction methods, when a candidate of a character is recalled, the limitation that the candidate must be similar to the original character in pronunciation or pattern is usually added, thereby influencing the quality of the candidate and thus the error correction effect, and reducing the accuracy of an error correction result.

SUMMARY

The present application provides a method and apparatus for correcting character errors, an electronic device and a storage medium.

A method for correcting character errors includes: for a character to be processed, acquiring the score of each character in a pre-constructed vocabulary, the score being a score of the reasonability of the character in the vocabulary at the position of the character to be processed; selecting top K characters as candidates of the character to be processed, K being a positive integer greater than one; and selecting an optimal candidate from the K candidates, and replacing the character to be processed with the optimal candidate if the optimal candidate is different from the character to be processed.

An electronic device includes: at least one processor; and a memory communicatively connected with the at least one processor; wherein the memory stores instructions executable by the at least one processor, and the instructions are executed by the at least one processor to enable the at least one processor to perform a method for correcting character errors. The method includes for a character to be processed, acquiring the score of each character in a pre-constructed vocabulary, the score being a score of the reasonability of the character in the vocabulary at the position of the character to be processed; selecting top K characters as candidates of the character to be processed, K being a positive integer greater than one; and selecting an optimal candidate from the K candidates, and replacing the character to be processed with the optimal candidate if the optimal candidate is different from the character to be processed.

There is provided a non-transitory computer-readable storage medium storing computer instructions therein, wherein the computer instructions are used to cause the computer to perform a method for correcting character errors, wherein the method includes: for a character to be processed, acquiring the score of each character in a pre-constructed vocabulary, the score being a score of the reasonability of the character in the vocabulary at the position of the character to be processed; selecting top K characters as candidates of the character to be processed, K being a positive integer greater than one; and selecting an optimal candidate from the K candidates, and replacing the character to be processed with the optimal candidate if the optimal candidate is different from the character to be processed.

One embodiment of the above-mentioned application has the following advantages or beneficial effects: the limitation of a similar pronunciation, a similar pattern, or the like, is avoided for the acquired candidates, and instead, according to the reasonability score, the top K characters are selected from the whole vocabulary to serve as the candidates, thereby acquiring candidates which are more diverse, and improving the quality of the candidates and thus the accuracy of an error correction result.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present application. In the drawings.

DETAILED DESCRIPTION

The following part will illustrate exemplary embodiments of the present application with reference to the figures, including various details of the embodiments of the present application for a better understanding. The embodiments should be regarded only as exemplary ones. Therefore, those skilled in the art should appreciate that various changes or modifications can be made with respect the embodiments described herein without departing from the scope and spirit of the present application. Similarly, for clarity and conciseness, the descriptions of the known functions and structures are omitted in the descriptions below.

In addition, it should be understood that the term "and/or" only describes an association relationship between associated objects, and indicates that three relationships may exist. For example, A and/or B may indicate three cases: only A exists; both A and B exist; and only B exists. In addition, in this specification, the symbol "/" generally indicates that associated objects before and after have a relationship of "or".

Figure 1:
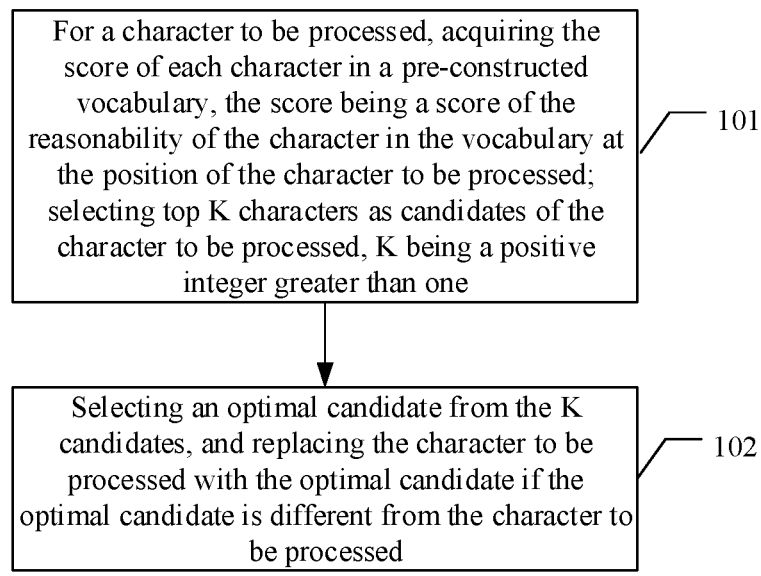
FIG. 1 is a flow chart of a first embodiment of a method for correcting character errors according to the present application.

FIG. 1 is a flow chart of a first embodiment of a method for correcting character errors according to the present application. As shown in FIG. 1, the method includes the following implementation steps:

101: for a character to be processed, acquiring the score of each character in a pre-constructed vocabulary, the score being a score of the reasonability of the character in the vocabulary at the position of the character to be processed; selecting top K characters as candidates of the character to be processed, K being a positive integer greater than one; and 102: selecting an optimal candidate from the K candidates, and replacing the character to be processed with the optimal candidate if the optimal candidate is different from the character to be processed.

In practical applications. N characters in a text to be processed may serve as the characters to be processed, wherein N is a positive integer and has a maximum value equal to the number of characters included in the text to be processed; that is, any character in the text to be processed may serve as the character to be processed, or a part of the characters in the text to be processed may serve as the characters to be processed, or each character in the text to be processed may serve as the character to be processed.

For example, the text to be processed may include a sentence, and as a possible implementation, each character in the sentence may serve as the character to be processed, and processed by means of 101-102.

First, candidates (error correction candidates) of the character to be processed are recalled and acquired. For example, the score of each character in the pre-constructed vocabulary may be acquired, and is a score of the reasonability of the character in the vocabulary at the position of the character to be processed, and the top K characters are selected as the candidates of the character to be processed. Preferably, when acquired, the score of each character in the vocabulary may be rapidly determined with a pre-trained language model accurately, thereby laying a good foundation for subsequent processing actions. An acquiring/training method of the language model will be explained below.

The language model may be trained by means of a deep learning process, or the like, and the training process may include a pre-training process and a fine-tuning process.

In the pre-training process, first-class training data may be acquired, and each piece of the first-class training data may include an input text and an output text which are the same and do not contain wrongly written characters, and then, the language model may be pre-trained at character granularity utilizing the first-class training data.

The language model may have a structure of a transformer, and is pre-trained at the character granularity, such that the model learns the expression of the text. How to pre-train the language model at the character granularity is a prior art.

After the pre-training process is completed, the language model may be further fine-tuned. Correspondingly, second-class training data may be acquired, and each piece of the second-class training data may include an input text containing wrongly written characters and an output text which corresponds to the input text and does not contain wrongly written characters, and then, the language model may be fine-tuned using the second-class training data.

The number of the wrongly written characters included in the input text is not limited, and may be one or more. The output text is a correct text corresponding to the input text.

In the fine-tuning process, only the loss of the position of the wrongly written character may be calculated, and then, model parameters may be updated according to the acquired loss. A targeted learning process may be performed only for the position of the wrongly written character, thereby improving the learning efficiency, or the like.

With the above-mentioned method, candidates which are more diverse may be fused in the model as many as possible; when the input text and the output text are the same, the learning process of the expression of the text by the model tends to map each character to itself, and each character is mapped to the corresponding correct character through the fine tuning process, which means that each character has higher possibility to be changed into other characters, thereby introducing the candidates which are more diverse.

After the language model is pre-trained and fine-tuned, the score of each character in the vocabulary may be determined with the language model. The vocabulary is pre-constructed, has no limitation in the construction method, and may contain a plurality of different characters. For the character to be processed, the score of each character in the vocabulary (i.e., the score of the reasonability of the character in the vocabulary at the position of the character to be processed) may be calculated utilizing the language model, and then, the top K characters may be selected as the candidates of the character to be processed, wherein the specific value of K may be determined according to actual requirements, such as 24.

In practical applications, the language model may simultaneously obtain the scores corresponding to all the characters in the text to be processed. That is, for the input text, the language model may output a matrix with L rows and P columns, wherein L represents the number of the characters in the text, and P represents the number of the characters in the vocabulary; each row corresponds to one character in the text, each column corresponds to one character in the vocabulary, each element in the matrix may have a value between 0 and 1, and the value of any element represents the score of the reasonability of the corresponding character in the vocabulary at the position of the corresponding character in the text.

It is observed that by means of the above-mentioned processing action, the limitation of a similar pronunciation, a similar pattern, or the like, is avoided for the acquired candidates, and instead, according to the reasonability score, the top K characters are selected from the whole vocabulary to serve as the candidates, thereby acquiring the candidates which are more diverse, and improving the quality of the candidates and thus the accuracy of an error correction result.

The optimal candidate may be further selected from the determined K candidates of the character to be processed, and the character to be processed may be replaced with the optimal candidate if the optimal candidate is different from the character to be processed, thereby achieving the aim of error correction.

Specifically, the K candidates may be ranked first, and the top M candidates after ranking are selected, wherein M is a positive integer greater than one and less than K; then, context information of the position of the character to be processed may be fused for decoding, and the optimal candidate is selected from the M candidates.

By ranking and selecting the candidates, the number of the candidates may be reduced, thereby facilitating subsequent processing actions, such as reduction of decoding workloads, or the like.

The K candidates may be ranked by: acquiring predetermined features corresponding to any candidate, scoring the candidate according to the predetermined features and a pre-trained candidate ranking model, and ranking the K candidates according to the corresponding scores from high to low.

The specific predetermined features may be determined according to actual requirements, and may include, for example, n-gram context features, features of the candidates, features of the character to be processed, related features of replacement of the character to be processed with the candidates, or the like. Generally speaking, the richer the acquired features are, the more accurate the scores obtained based on the features will be, and the more accurate the candidate ranking result is.

The candidate ranking model is acquired in advance by means of the deep learning process, or the like, and the acquiring method is not limited. The features corresponding to any candidate may be input into the candidate ranking model to obtain the output score of the candidate. Thus, the K candidates of the character to be processed may be ranked according to the corresponding scores from high to low, and the top M candidates after ranking may be selected. The specific value of M may be determined according to actual requirements, such as 5.

Further, the context information of the position of the character to be processed may be fused for decoding, and the required optimal candidate may be selected from the M candidates, which is implemented in the prior art, and a Viterbi decoding algorithm, or the like may be adopted for the decoding process.

Figure 2:
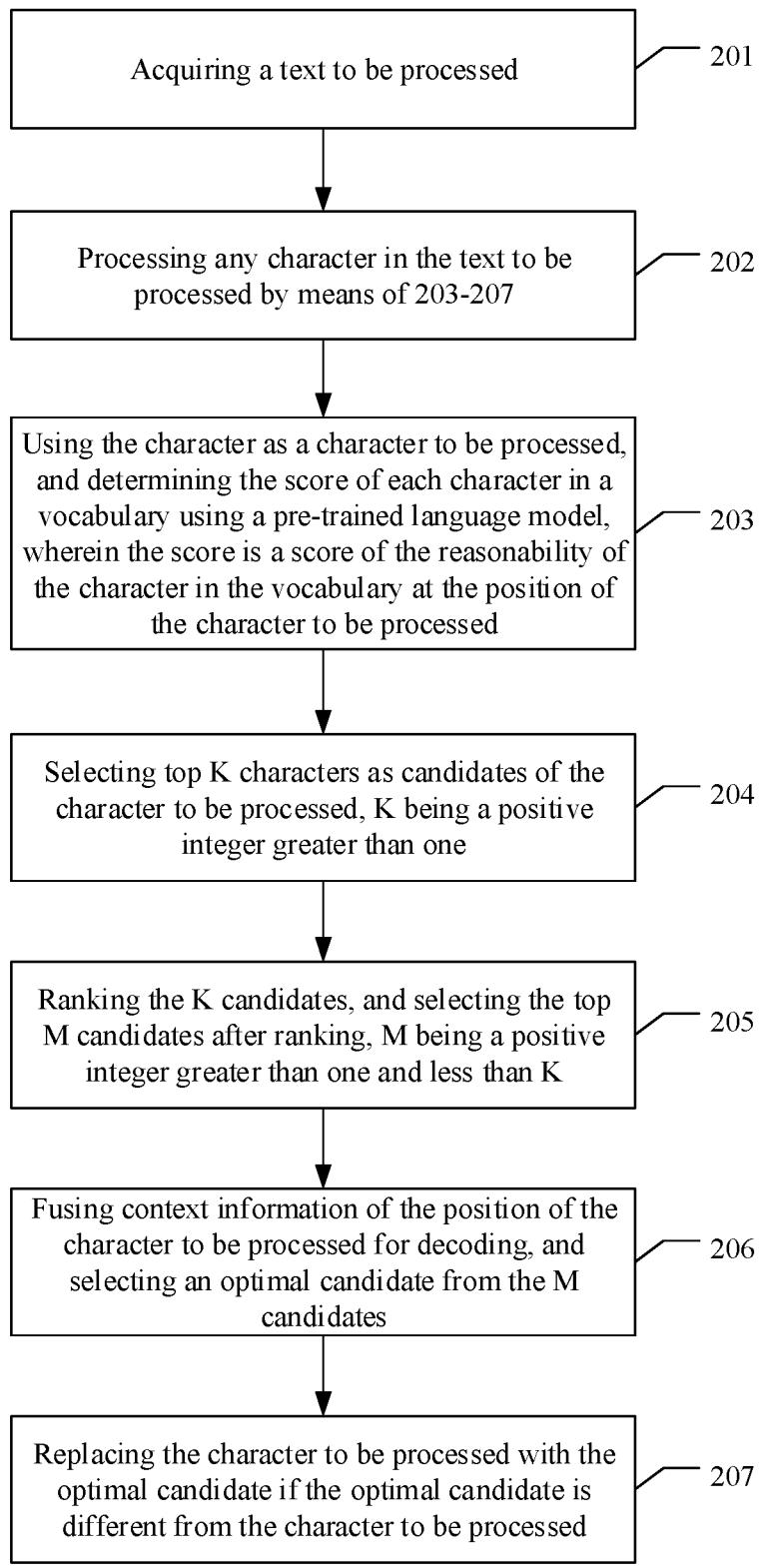
FIG. 2 is a flow chart of a second embodiment of a method for correcting character errors according to the present application.

Based on the above description, FIG. 2 is a flow chart of a second embodiment of a method for correcting character errors according to the present application. As shown in FIG. 2, the method includes the following implementation steps:

201: acquiring a text to be processed.

202: processing any character in the text to be processed by means of 203-207.

In this embodiment, it is assumed that each character in the text to be processed is processed by means of 203-207.

203: using the character as a character to be processed, and determining the score of each character in a vocabulary using a pre-trained language model, wherein the score is a score of the reasonability of the character in the vocabulary at the position of the character to be processed.

A method for acquiring the language model may include: acquiring first-class training data, any piece of the first-class training data including an input text and an output text which are the same and do not contain wrongly written characters; pre-training the language model at character granularity utilizing the first-class training data: acquiring second-class training data, any piece of the second-class training data including an input text containing wrongly written characters and an output text which corresponds to the input text and does not contain wrongly written characters; and fine-tuning the language model using the second-class training data.

In the fine-tuning process, only the loss of the position of the wrongly written character may be calculated.

204: selecting top K characters as candidates of the character to be processed, K being a positive integer greater than one.

205: ranking the K candidates, and selecting the top M candidates after ranking, M being a positive integer greater than one and less than K.

Predetermined features corresponding to any one of the K candidates may be acquired, the candidate is scored according to the predetermined features and a pre-trained candidate ranking model, and the K candidates may be ranked according to the corresponding scores from high to low, so as to select the top M candidates after ranking.

206: fusing context information of the position of the character to be processed for decoding, and selecting an optimal candidate from the M candidates.

207: replacing the character to be processed with the optimal candidate if the optimal candidate is different from the character to be processed.

If the optimal candidate is the same as the character to be processed, no replacement is required.

The method for correcting character errors according to the present application will be further described below by a specific example.

Figure 3:
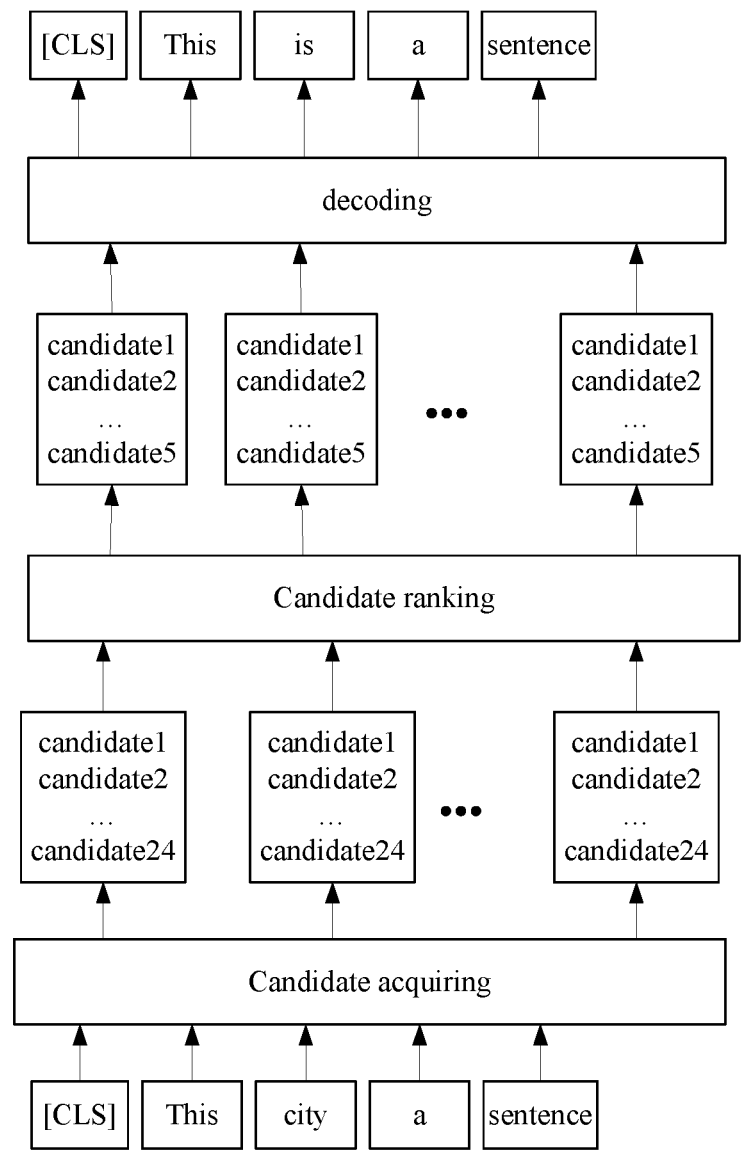
FIG. 3 is a schematic diagram of an example of the method for correcting character errors according to the present application.

FIG. 3 is a schematic diagram of an example of the method for correcting character errors according to the present application. As shown in FIG. 3, assuming that the text to be processed is "this city a sentence", taking the character "city" as an example, the score of each character in the vocabulary may be acquired, top 24 characters may be selected as the candidates of the character "city", and then ranked, first 5 candidates are selected, the optimal candidate "is" may be selected from the 5 candidates by operations, such as decoding, or the like, and the character "city" is replaced with "is".

It should be noted that for simplicity of description, the above-mentioned embodiments of the method are described as combinations of a series of acts, but those skilled in the art should understand that the present application is not limited by the described order of acts, as some steps may be performed in other orders or simultaneously according to the present application. Further, those skilled in the art should also understand that the embodiments described in this specification are preferred embodiments and that acts and modules referred to are not necessary for the present application. In addition, for parts that are not described in detail in a certain embodiment, reference may be made to the related descriptions of other embodiments.

The above is a description of embodiments of the method, and the embodiments of an apparatus will be further described below.

Figure 4:
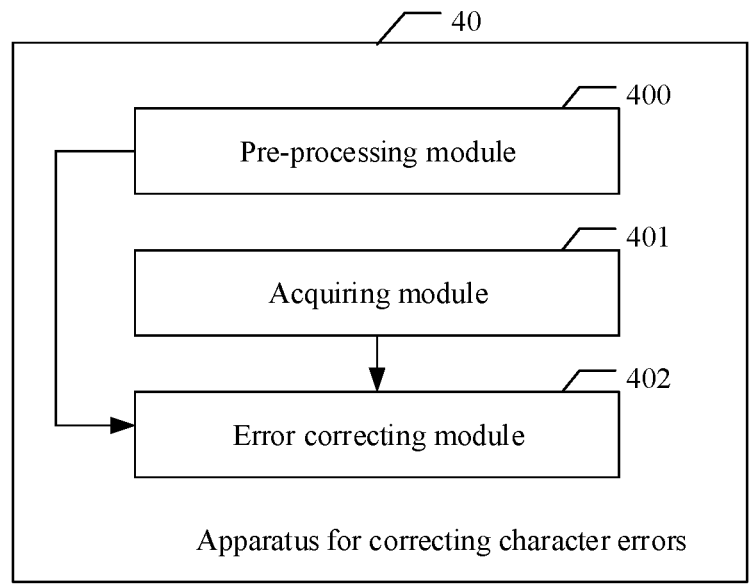
FIG. 4 is a schematic structural diagram of an embodiment of an apparatus 40 for correcting character errors according to the present application.

FIG. 4 is a schematic structural diagram of an embodiment of an apparatus 40 for correcting character errors according to the present application. As shown in FIG. 4, the apparatus includes: an acquiring module 401 configured to acquire a character to be processed: and an error correcting module 402 configured to, for the character to be processed, acquire the score of each character in a pre-constructed vocabulary, the score being a score of the reasonability of the character in the vocabulary at the position of the character to be processed; select top K characters as candidates of the character to be processed, K being a positive integer greater than one; select an optimal candidate from the K candidates; and replace the character to be processed with the optimal candidate if the optimal candidate is different from the character to be processed.

The acquiring module 401 may use N characters in a text to be processed as the characters to be processed, wherein N is a positive integer and has a maximum value equal to the number of characters included in the text to be processed.

First, the error correcting module 402 recalls and acquires candidates (error correction candidates) of the character to be processed. For example, the score of each character in the pre-constructed vocabulary may be acquired, and is a score of the reasonability of the character in the vocabulary at the position of the character to be processed, and the top K characters are selected as the candidates of the character to be processed. Preferably, when acquired, the score of each character in the vocabulary may be rapidly determined with a pre-trained language model accurately, Correspondingly, the apparatus shown in FIG. 4 may further include: a pre-processing module 400 configured to acquire first-class training data, any piece of the first-class training data including an input text and an output text which are the same and do not contain wrongly written characters; pre-train the language model at character granularity utilizing the first-class training data; acquire second-class training data, any piece of the second-class training data including an input text containing wrongly written characters and an output text which corresponds to the input text and does not contain wrongly written characters; and fine-tune the language model using the second-class training data. The language model may be pre-trained, and the training process may include a pre-training process and a fine-tuning process.

In the fine-tuning process, only the loss of the position of the wrongly written character may be calculated, and then, model parameters may be updated according to the acquired loss.

After the language model is pre-trained and fine-tuned, the error correcting module 402 may determine the score of each character in the vocabulary with the language model. The vocabulary is pre-constructed, has no limitation in the construction method, and may contain a plurality of different characters. For the character to be processed, the error correcting module 402 may calculate the score of each character in the vocabulary (i.e., the score of the reasonability of the character in the vocabulary at the position of the character to be processed) utilizing the language model, and then select the top K characters as the candidates of the character to be processed.

The error correcting module 402 may further select the optimal candidate from the determined K candidates of the character to be processed, and replace the character to be processed with the optimal candidate if the optimal candidate is different from the character to be processed, thereby achieving the aim of error correction.

Specifically, the error correcting module 402 may rank the K candidates first, and select the top M candidates after ranking, wherein M is a positive integer greater than one and less than K; then, the error correcting module 402 may fuse context information of the position of the character to be processed for decoding, and select the optimal candidate from the M candidates.

The K candidates may be ranked by: acquiring predetermined features corresponding to any candidate, scoring the candidate according to the predetermined features and a pre-trained candidate ranking model, and ranking the K candidates according to the corresponding scores from high to low. The specific predetermined features may be determined according to actual requirements.

The candidate ranking model is acquired in advance by means of the deep learning process, or the like, and the acquiring method is not limited. The features corresponding to any candidate may be input into the candidate ranking model to obtain the output score of the candidate.

For the specific work flow of the embodiment of the apparatus shown in FIG. 4, reference is made to the related description in the foregoing embodiment of the method, and details are not repeated.

In conclusion, with the solution of the embodiment of the apparatus according to the present application, the limitation of the similar pronunciation, the similar pattern, or the like, is avoided for the acquired candidates, and instead, according to the reasonability score, the top K characters are selected from the whole vocabulary to serve as the candidates, thereby acquiring the candidates which are more diverse, and improving the quality of the candidates and thus the accuracy of the error correction result; by training the language model, candidates which are more diverse may be fused in the model as many as possible, and the targeted learning process may be performed only for the position of the wrongly written character, thereby improving the learning efficiency, or the like; by ranking and selecting the candidates, the number of the candidates may be reduced, thereby facilitating subsequent processing actions, such as reduction of decoding work-loads, or the like.

According to the embodiments of the present application, there are also provided an electronic device and a readable storage medium.

Figure 5:
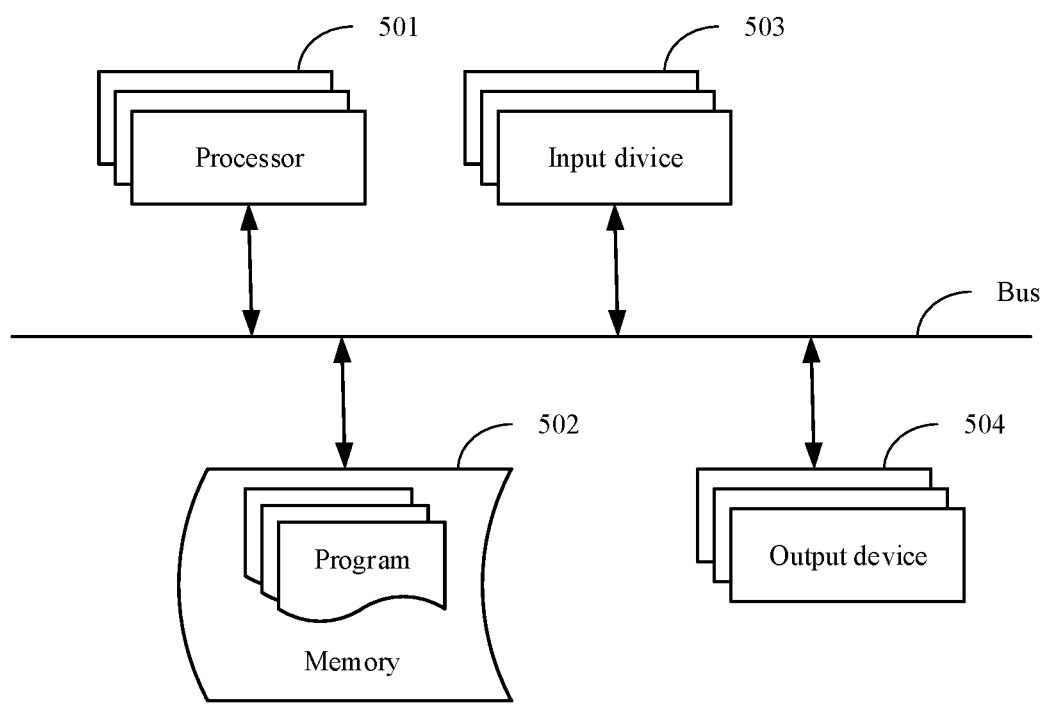
FIG. 5 is a block diagram of an electronic device for the method according to the embodiments of the present application.

FIG. 5 is a block diagram of an electronic device for the method according to the embodiments of the present application. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital processors, cellular telephones, smart phones, wearable devices, and other similar computing apparatuses. The components shown herein, their connections and relationships, and their functions, are meant to be exemplary only, and are not meant to limit implementation of the present application described and/or claimed herein.

As shown in FIG. 5, the electronic device includes one or more processors 501, a memory 502, and interfaces configured to connect the various components, including high-speed interfaces and low-speed interfaces. The various components are interconnected using different buses and may be mounted at a common motherboard or in other manners as desired. The processor may process instructions for execution within the electronic device, including instructions stored in or at the memory to display graphical information for a graphical user interface at an external input/output device, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 5, one processor 501 is taken as an example.

The memory 502 is configured as the non-transitory computer readable storage medium according to the present application. The memory stores instructions executable by the at least one processor to cause the at least one processor to perform a method according to the present application. The non-transitory computer readable storage medium according to the present application stores computer instructions for causing a computer to perform the method according to the present application.

The memory 502 which is a non-transitory computer readable storage medium may be configured to store non-transitory software programs, non-transitory computer executable programs and modules, such as program instructions/modules corresponding to the method according to the embodiments of the present application. The processor 501 executes various functional applications and data processing of a server, that is, implements the method according to the above-mentioned embodiments, by running the non-transitory software programs, instructions, and modules stored in the memory 502.

The memory 502 may include a program storage area and a data storage area, wherein the program storage area may store an operating system and an application program required for at least one function; the data storage area may store data created according to use of the electronic device, or the like. Furthermore, the memory 502 may include a high-speed random access memory, or a non-transitory memory, such as at least one magnetic disk storage device, a flash memory device, or other non-transitory solid state storage devices. In some embodiments, optionally, the memory 502 may include memories remote from the processor 501, and such remote memories may be connected to the electronic device via a network. Examples of such a network include, but are not limited to, the Internet, intranets, blockchain networks, local area networks, mobile communication networks, and combinations thereof.

The electronic device may further include an input device 503 and an output device 504. The processor 501, the memory 502, the input device 503 and the output device 504 may be connected by a bus or other means, and FIG. 5 takes the connection by a bus as an example.

The input device 503 may receive input numeric or character information and generate key signal input related to user settings and function control of the electronic device, such as a touch screen, a keypad, a mouse, a track pad, a touch pad, a pointing stick, one or more mouse buttons, a trackball, a joystick, or the like. The output device 504 may include a display device, an auxiliary lighting apparatus and a tactile feedback apparatus (for example, a vibrating motor), or the like. The display device may include, but is not limited to, a liquid crystal display, a light emitting diode display, and a plasma display. In some implementations, the display device may be a touch screen.

Various implementations of the systems and technologies described here may be implemented in digital electronic circuitry, integrated circuitry, application specific integrated circuits, computer hardware, firmware, software, and/or combinations thereof. These various implementations may be implemented in one or more computer programs which are executable and/or interpretable on a programmable system including at least one programmable processor, and the programmable processor may be special or general, and may receive data and instructions from, and transmitting data and instructions to, a storage system, at least one input device, and at least one output device.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, programmable logic devices) for providing machine instructions and/or data to a programmable processor, including a machine readable medium which receives machine instructions as a machine readable signal. The term "machine readable signal" refers to any signal for providing machine instructions and/or data to a programmable processor.

To provide interaction with a user, the systems and technologies described here may be implemented on a computer having: a display apparatus (for example, a cathode ray tube or liquid crystal display monitor) for displaying information to a user; and a keyboard and a pointing apparatus (for example, a mouse or a trackball) by which a user may provide input to the computer. Other kinds of apparatuses may also be used to provide interaction with a user; for example, feedback provided to a user may be any form of sensory feedback (for example, visual feedback, auditory feedback, or tactile feedback); and input from a user may be received in any form (including acoustic, voice or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network, a wide area network, a blockchain network and the Internet.

A computer system may include a client and a server. Generally, the client and the server are remote from each other and interact through the communication network. The relationship between the client and the server is generated by virtue of computer programs which are run on respective computers and have a client-server relationship to each other.

It should be understood that various forms of the flows shown above may be used and reordered, and steps may be added or deleted. For example, the steps described in the present application may be executed in parallel, sequentially, or in different orders, and are not limited herein as long as the desired results of the technical solution disclosed in the present application may be achieved.

The above-mentioned embodiments are not intended to limit the scope of the present application. It should be understood by those skilled in the art that various modifications, combinations, sub-combinations and substitutions may be made, depending on design requirements and other factors. Any modification, equivalent substitution and improvement made within the spirit and principle of the present application all should be included in the extent of protection of the present application.

What is claimed is:

1. A computer-implemented method for correcting character errors, comprising:

for a character to be processed, acquiring the score of each character in a pre-constructed vocabulary, the score being a score of the reasonability of the character in the vocabulary at the position of the character to be processed; selecting top K characters as candidates of the character to be processed, K being a positive integer greater than one; and selecting an optimal candidate from the K candidates, and replacing the character to be processed with the optimal candidate if the optimal candidate is different from the character to be processed, wherein the acquiring the score of each character in a pre-constructed vocabulary comprises: determining the score of each character in the vocabulary with a pre-trained language model, wherein the acquiring the language model comprises:

acquiring first-class training data, any piece of the first-class training data comprising an input text and an output text which are the same and do not contain wrongly written characters;

pre-training the language model at character granularity utilizing the first-class training data;

acquiring second-class training data, any piece of the second-class training data comprising an input text containing wrongly written characters and an output text which is a correct text corresponding to the input text and does not contain wrongly written characters; and fine-tuning the language model using the second-class training data, and in the fine-tuning process, only the position of the wrongly written character is calculated to update the parameters of the language model.

2. The method according to claim 1, further comprising: using N characters in a text to be processed as the characters to be processed, N being a positive integer and having a maximum value equal to the number of characters comprised in the text to be processed.

3. The method according to claim 1, wherein the selecting an optimal candidate from the K candidates comprises:

ranking the K candidates, and selecting the top M candidates after ranking, M being a positive integer greater than one and less than K; and considering context information of the position of the character to be processed for decoding, and selecting the optimal candidate from the M candidates.

4. The method according to claim 3, wherein the ranking the K candidates comprises:

acquiring predetermined features corresponding to any candidate, and scoring the candidate according to the predetermined features and a pre-trained candidate ranking model; and ranking the K candidates according to the corresponding scores from high to low.

5. An electronic device, comprising:

at least one processor; and a memory communicatively connected with the at least one processor;

wherein the memory stores instructions executable by the at least one processor, and the instructions are executed by the at least one processor to enable the at least one processor to perform a method for correcting character errors, wherein the method comprises:

for a character to be processed, acquiring the score of each character in a pre-constructed vocabulary, the score being a score of the reasonability of the character in the vocabulary at the position of the character to be processed; selecting top K characters as candidates of the character to be processed, K being a positive integer greater than one; and selecting an optimal candidate from the K candidates, and replacing the character to be processed with the optimal candidate if the optimal candidate is different from the character to be processed, wherein the acquiring the score of each character in a pre-constructed vocabulary comprises: determining the score of each character in the vocabulary with a pre-trained language model, wherein the acquiring the language model comprises:

acquiring first-class training data, any piece of the first-class training data comprising an input text and an output text which are the same and do not contain wrongly written characters;

pre-training the language model at character granularity utilizing the first-class training data;

acquiring second-class training data, any piece of the second-class training data comprising an input text containing wrongly written characters and an output text which is a correct text corresponding s to the input text and does not contain wrongly written characters; and fine-tuning the language model using the second-class training data, and in the fine-tuning process, only the position of the wrongly written character is calculated to update the parameters of the language model.

6. The electronic device according to claim 5, further comprising: using N characters in a text to be processed as the characters to be processed, N being a positive integer and having a maximum value equal to the number of characters comprised in the text to be processed.

7. The electronic device according to claim 5, wherein the selecting an optimal candidate from the K candidates comprises:

ranking the K candidates, and selecting the top M candidates after ranking, M being a positive integer greater than one and less than K; and considering context information of the position of the character to be processed for decoding, and selecting the optimal candidate from the M candidates.

8. The electronic device according to claim 7, wherein the ranking the K candidates comprises:

acquiring predetermined features corresponding to any candidate, and scoring the candidate according to the predetermined features and a pre-trained candidate ranking model; and ranking the K candidates according to the corresponding scores from high to low.

9. A non-transitory computer-readable storage medium storing computer instructions therein, wherein the computer instructions are used to cause the computer to perform a method for correcting character errors, wherein the method comprises:

for a character to be processed, acquiring the score of each character in a pre-constructed vocabulary, the score being a score of the reasonability of the character in the vocabulary at the position of the character to be processed; selecting top K characters as candidates of the character to be processed, K being a positive integer greater than one; and selecting an optimal candidate from the K candidates, and replacing the character to be processed with the optimal candidate if the optimal candidate is different from the character to be processed, wherein the acquiring the score of each character in a pre-constructed vocabulary comprises: determining the score of each character in the vocabulary with a pre-trained language model, wherein the acquiring the language model comprises:

acquiring first-class training data, any piece of the first-class training data comprising an input text and an output text which are the same and do not contain wrongly written characters;

pre-training the language model at character granularity utilizing the first-class training data;

acquiring second-class training data, any piece of the second-class training data comprising an input text containing wrongly written characters and an output text which is a correct text corresponding to the input text and does not contain wrongly written characters; and fine-tuning the language model using the second-class training data, and in the fine-tuning process, only the position of the wrongly written character is calculated to update the parameters of the language model.

10. The non-transitory computer-readable storage medium according to claim 9, further comprising: using N characters in a text to be processed as the characters to be processed, N being a positive integer and having a maximum value equal to the number of characters comprised in the text to be processed.

11. The non-transitory computer-readable storage medium according to claim 9, wherein the selecting an optimal candidate from the K candidates comprises:

ranking the K candidates, and selecting the top M candidates after ranking, M being a positive integer greater than one and less than K; and considering context information of the position of the character to be processed for decoding, and selecting the optimal candidate from the M candidates.

* * * * *